United States Patent

[11] 3,599,477

[72] Inventors Sherman E. Cohen
Atlanta;
William H. Sproat, Sr., Smyrna, both of, Ga.
[21] Appl. No. 824,645
[22] Filed May 14, 1969
[45] Patented Aug. 17, 1971
[73] Assignee Lockheed Aircraft Corporation
Burbank, Calif.

[54] APPARATUS FOR CONVERTING ACOUSTIC ENERGY INTO A VISIBLE IMAGE
8 Claims, 3 Drawing Figs.

[52] U.S. Cl. .................................................. 73/67.5 R, 340/5 I
[51] Int. Cl. ..................................................... G01n 29/04
[50] Field of Search .......................................... 73/67.5-
—67.9; 340/5 I; 181/0.5 AP, 0.5 NP

[56] References Cited
UNITED STATES PATENTS
2,592,222 4/1952 Williams ........................ 73/67.6
2,803,128 8/1957 Petermann ................... 73/67.6

FOREIGN PATENTS
541,959 12/1941 Great Britain ................ 73/67.5

OTHER REFERENCES
Ernst et al., New Methods Of Ultrasonoscopy And Ultrasonography J.A.S.A., Vol. 24, No. 2, March 1952, pp. 207—210.

Suckling et al., A Method Of Transducing An Ultrasonic Shadowgraph Or Image For Display On An Oscilloscope J.A.S.A., Vol. 27, No. 2, March 1955, pp. 297— 301.

*Primary Examiner*—Richard C. Queisser
*Assistant Examiner*—John P. Beauchamp
*Attorneys*—Roger T. Frost and George C. Sullivan

ABSTRACT: Apparatus for converting information in the acoustic domain into visible patterns. Acoustic energy is conducted through a wave-transmitting medium to impinge on an absorptive layer which converts the acoustic energy into thermal energy. The thermal energy is transmitted to a layer of a suitable thermochromic substance such as cholesteric liquid crystals, so that the thermochromic layer undergoes a characteristic color change corresponding to the intensity and the location of the wave of vibratory energy.

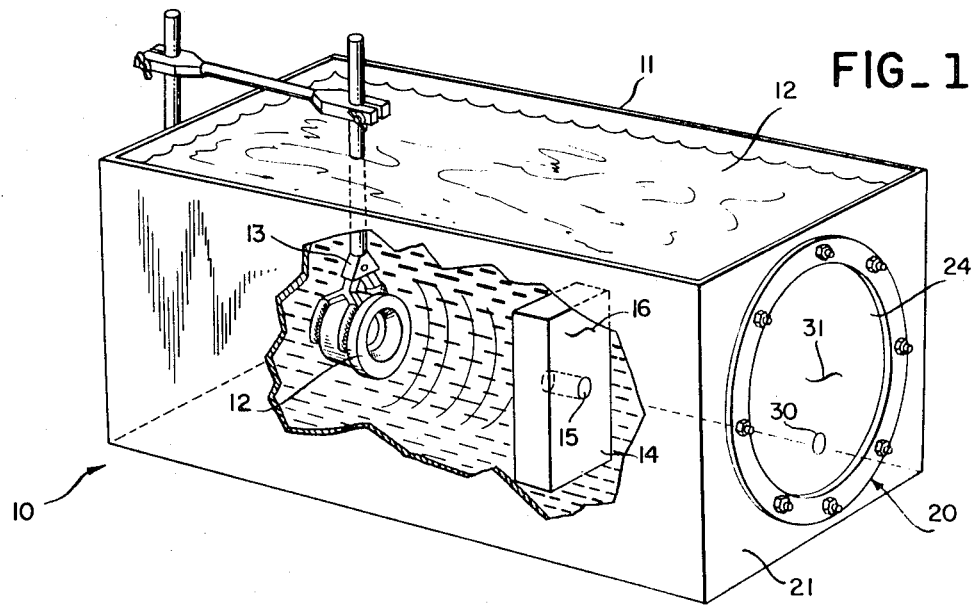
FIG_1
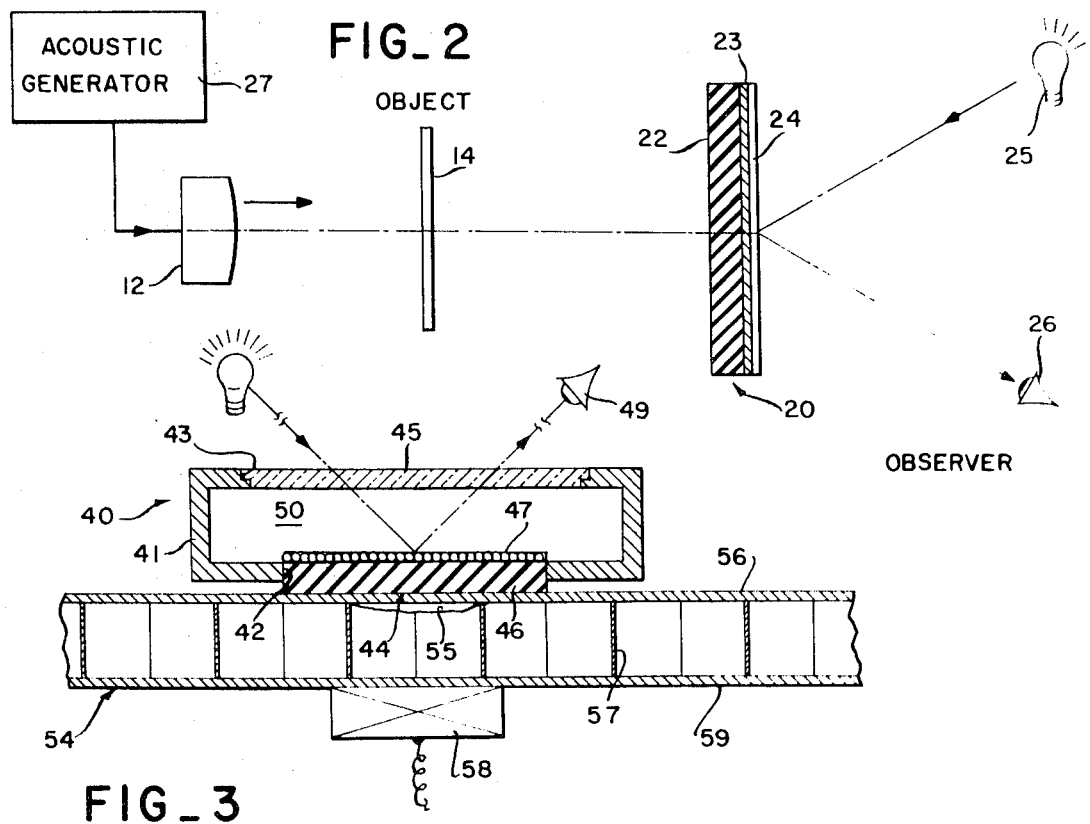
FIG_2
FIG_3
INVENTORS
SHERMAN E. COHEN
WILLIAM H. SPROAT, SR.
By George C. Sullivan, agent
Roger T. Frost
Attorney

APPARATUS FOR CONVERTING ACOUSTIC ENERGY INTO A VISIBLE IMAGE

This invention relates in general to acoustic energy conversion and in particular to apparatus for converting acoustic energy into a visible image.

The term "acoustic energy" is used herein to denote vibratory energy, whether within or outside of the range of human audibility, which is conducted or transmitted through a medium such as air, a liquid, or a solid.

Acoustic energy is used in many applications for which it would be helpful or desirable to obtain a visual image or representation of the acoustic energy. For example, acoustic energy is widely used in nondestructive testing to examine a workpiece for the existence of flaws such as cracks, unsound joints, and the like. This can be accomplished by subjecting the workpiece to a beam of acoustic energy and examining the energy that is reflected from or conducted through various portions of the workpiece to determine whether the presence of a structural defect or a particular structural feature has modified the amplitude and/or the spatial position of the acoustic energy reflected or retransmitted from the workpiece. The acoustic energy from the workpiece can be examined by a transducer such as a microphone. However, a microphone indicates the amplitude of the acoustic energy at one location only and cannot provide a visual representation of the overall acoustic characteristics of the workpiece. The microphone can be mechanically scanned through the wave front of acoustic energy from the workpiece to evaluate the acoustic characteristics of the workpiece, or a number of microphones can be positioned at different locations to receive different signals which can be correlated to approximate the nature of the wave front of acoustic energy. Such techniques, however, are expensive and unwieldy in practice and provide information only of discrete points along the acoustic wave front.

Techniques for providing a visual image from a wave front of acoustic energy are known to the prior art. In one such technique, for example, a wave front of acoustic energy impinges a gridlike mosaic of piezoelectric elements or a piezoelectric face plate. The acoustic energy impinging each piezoelectric element in the mosaic or impinging different regions on the faceplate generates a voltage across that element or region proportional to the intensity of the impinging energy. The voltages present on the mosaic of piezoelectric elements or on the face plate are scanned in a manner similar to the raster scanning employed in a conventional television camera to produce a videolike signal which is applied to a cathode ray tube to provide a visual representation of the acoustic energy wave front. It will be appreciated that this prior art system suffers the disadvantages of any imaging system which uses line-scanning to scan discrete image elements, such as the piezoelectric mosaic, to create an electrical signal analogous to the wave front impinging on the mosaic. The resolution of such a system depends on the size of the individual mosaic elements and the density of the scanning lines. Moreover, the piezoelectric mosaic or faceplate and the associated scanning apparatus are complex and expensive, and such a system cannot indicate some nonpositional parameter such as image intensity through variations in the color of the reproduced video image.

Accordingly, it is an object of this invention to provide improved apparatus for converting acoustic energy into a visible image. It is another object of this invention to provide apparatus for converting acoustic energy into a visible image which can be viewed directly without resort to image scanning.

It is a further object of this invention to provide apparatus for converting acoustic energy into a visible image which provides a real-time visible representation of the acoustic energy.

It is a further object of this invention to provide apparatus for converting acoustic energy into a visible image the color of which is a function of a characteristic of the acoustic energy being converted.

The exact nature of this invention, as well as other objects and advantages thereof, will be readily apparent from consideration of the following specification relating to the annexed drawing in which:

FIG. 1 shows a partially cutaway isometric view of an embodiment of the present invention;

FIG. 2 shows a schematic partial section view of the apparatus shown in FIG. 1; and FIG. 3 shows a schematic view of another embodiment of the invention used to test a workpiece.

Stated generally, the present invention includes an absorptive layer which is positioned to receive the acoustic energy being examined and which converts at least a portion of the received acoustic energy into thermal energy. The thermal energy thus present in the absorptive layer is transferred to a thermochromic coating which may be carried on a thermally conductive support member interposed between the absorptive layer and the thermochromic coating. The acoustic energy impinging the absorptive layer can emanate, for example, from a transducer directed toward a workpiece positioned between the transducer and the absorptive layer, so that the acoustic energy conducted through and/or reflected from the workpiece impinges the absorptive layer. The observable color change of the thermochromic coating is a function of the spatial location and the amplitude of the acoustic energy impinging the absorptive layer.

An embodiment of the present invention is shown in greater detail in FIG. 1, such embodiment having apparatus denoted generally at 10 and including a liquid tank 11 which may have an open top. A suitable acoustic transducer 12 is supported in the tank 11 by a support assembly 13 so that the transducer, when connected to a suitable source of vibratory energy such as an oscillator 27, directs a wave front of acoustic energy toward an exemplary test object 14. To explain the operation of the present invention, test object 14 is illustrated as having an opening 15 to permit the unimpeded passage of acoustic energy therethrough and a crack 16 representing a flaw in the test object.

A viewing assembly 20 is mounted in the opening at the end 21 of the tank 11 to receive the acoustic energy emitted from the transducer 12 and modified by the test object 14. The tank 11 preferably is filled at least to a level which submerges the transducer 12, the object 14, and the interior area (not shown) of the viewing assembly 20 with a medium, such as water, which is a good conductor of acoustic energy.

The apparatus depicted thus far in FIG. 1, as well as additional details of the viewing assembly 20, are shown schematically in FIG. 2. The viewing assembly 20 includes an absorptive layer 22 positioned to receive the acoustic energy emitted by the transducer 12 and modified by conduction through and/or reflection through the object 14. The absorptive layer 22 is made of a material which converts the impinging acoustic energy into thermal energy. For example, a viscoelastic material such as silicone rubber effectively converts acoustic energy into thermal energy by means of the mechanical hysteresis of the material.

The absorptive layer 22 is in thermal conductive contact with a thermally conductive support member 23 which supports the hydrostatic load imposed on the absorptive layer 22 by the liquid within the tank 11 By way of specific example, apparatus embodying the present invention has been constructed with a support member 23 made of a steel diaphragm having a thickness of 0.003 inch and with the absorptive layer 22 consisting of a layer of silicone rubber 0.032 inch in thickness coated on the diaphragm side which faces into the tank 11.

The support member 23 also functions as a substrate for the thermochromic coating 24 which is applied thereto and which provides the visual image of the acoustic energy striking the absorptive layer. While the thermochromic coating 24 can be made of any substance which undergoes a real or apparent color change in response to a temperature change, liquid crystal substances derived from cholesterol have been found to be especially useful as a thermochromic coating in the present invention. These liquid crystal substances, the nature and operation of which are known in the prior art and are described, for example, in the Aug. 1964 edition of Scientific American, undergo striking changes in their apparent or observed color in response to temperature changes in the order of a fractional part of a degree Fahrenheit. This apparent color change of liquid crystal substances is believed to be produced by changes in the refractive properties of the liquid crystal substance brought about by the change in temperature. Thus, the color of the light from the source of illumination 25, as refracted from a liquid crystal coating 24 toward an observer 26, depends on the temperature of the coating.

The operation of the illustrative embodiment is now described. The transducer 12 is connected to a suitable oscillator 27 to receive power which causes the transducer to emit acoustic energy at a frequency or frequencies preferably above the range of human audibility. The acoustic output of the transducer 12 is directed toward the viewing assembly 20. Suitable acoustical lenses, mirrors, wave guides, and other acoustic devices and techniques known to the art may be used as necessary or desirable to focus or otherwise to control the wave front of acoustic energy emanating from the transducer 12.

The test object 14 in the depicted example is a solid metal block, made of a metal such as aluminum, which has an opening 15 passing partly or completely through the block and a crack 16 in a surface of the block. The opening 15 and the crack 16 represent unwanted flaws or defects in the test object. When the test object 14 is subjected to acoustic energy from the transducer 12, the acoustic energy which impinges the opening 15 passes through this opening and proceeds onward with a certain energy intensity to impinge the absorptive layer 22 of the viewing assembly 20. Acoustic energy which strikes the solid portions of the object 14, however, is modified to be either completely absorbed in or reflected from such solid portions, or to be partially absorbed and partially retransmitted toward the absorptive layer 22 at a spatially or temporally modulated intensity relative to the acoustic energy which passed through the opening 15. The region on the absorptive layer 22 impinged by the acoustic energy of greater intensity receives more thermal energy than the corresponding regions on the absorptive layer which are impinged by acoustic energy of lesser intensity, and the different temperatures on the absorptive layer corresponding to different intensities of acoustic energy are transmitted by thermal conduction through the support member 23 to the liquid crystal thermochromic coating 24. There the regions of greater acoustic energy transmittal, such as through the opening 15, are manifested as shown at region 30 of FIG. 1 by a color which is distinctive with respect to the colors of cooler portions of the thermochromic coating. Thus, an observer of the viewing assembly can quickly learn from the presence of the "hot" region 30 that the test object 14 has some structural characteristic or anomaly which causes a nonuniform transferral of acoustic energy through the object. The crack 16 causes an anomaly in the reflection, absorption, and/or dissipation of the acoustic energy which is normally retransmitted toward the absorptive layer 22, and this anomaly appears on the thermochromic coating 24 as a crack image 31.

If the opening 15 had extended, for example, only partially through the test object 14, the difference between the intensity of the acoustic energy transmitted through the opening 15 and that transmitted through the remainder of the object 14 would not be as great as it was with a complete opening 15. However, this energy differential establishes a temperature differential on the absorptive layer 22 which is manifested by a corresponding change of color on the thermochromic coating 24. The effectiveness of the present invention in penetrating test objects depends on a number of variables, such as the frequency and the intensity of the acoustic energy applied to the test object, and attenuation of acoustic energy by the water or other energy-transmitting medium. As an example of the capabilities of this invention and without intent to limit, test objects of steel 1 inch thick and of aluminum 2 inches thick have been penetrated to produce corresponding images on the viewing assembly with the use of an acoustic energy beam intensities ranging from 100 to 500 watts/cm$^2$. An aluminum block of 2 inches thickness was penetrated using approximately 300 watts/cm$^2$ of acoustic power for an exposure time of 5 seconds. As a further example of an application of the present invention, a visual image of 1/16-inch diameter hole through 2 inches of aluminum was obtained on the viewing assembly with an acoustic operating frequency of 5 MHz.

Satisfactory results for nondestructive testing purposes have been obtained with operating frequencies in a range of 1—10 MHz. Generally speaking, resolution of the visual image improves with high-acoustic frequencies while acoustic transmission losses are reduced at lower frequencies while acoustic transmission losses are reduced at lower frequencies. Typical acoustic beam intensities range from 1 to 500 watts/cm$^2$. It will be apparent to those skilled in the art that the higher beam intensities are required for applications involving penetration of substantial thicknesses and/or long distances between the acoustic transducer and the viewing assembly.

The absorptive layer 22 preferably is of a material which is highly absorbent of acoustic energy. The thickness of the absorptive layer must be large enough to effectively absorb acoustic energy, i.e., to convert the energy of an impinging acoustic wave front into thermal energy at a rate sufficient to induce rapid temperature change of the absorptive layer for real-time or near real-time viewing. However, the absorptive layer should be thin enough to avoid the effect of a large heat sink and also to minimize the image resolution degrading effects of thermal diffusion across areas of different temperature on the absorptive layer. The considerations of heat sink effect and unwanted thermal diffusion also are present in the support member 23; this support member can be eliminated if an absorptive layer 22 is provided which is capable of supporting the hydrostatic load of the liquid in the tank and which has otherwise acceptable thermal characteristics. The heat transfer characteristics of the support member affect the retention time of the image on the viewing assembly.

The temperature of the water or other liquid in the tank 11 can be controlled to maintain the thermochromic coating 24 at the threshold of a desired temperature range corresponding to a particular color change or spectrum of color changes. In this way, the amount of additional thermal energy which must be added from absorbed acoustic energy to obtain a particular degree of color change is minimized. For example, with a thermochromic coating comprising a liquid crystal substance exhibiting a desired spectrum of color change along a temperature range of 95—97°F., the water in the tank 11 can be maintained at a temperature of almost 95° F. Since this water is in direct contact with the absorptive layer 22, a thermal bias thus is applied to the liquid crystal coating to eliminate the need for excessively large acoustic energy inputs otherwise necessary at normal room temperatures to achieve the desired color transition on the liquid crystal coating. The therm. stability of the volume of water in the tank also minimizes the effect on the liquid crystal coating of unwanted transient conditions, such as variations in room air temperature, not resulting from acoustic energy emitted from the transducer 12.

With the invention embodiment described herein, typical exposure durations of one to ten seconds have been required to produce a satisfactory visual image, depending on such variables as the thickness of the test object 14 and the frequency and amplitude of the acoustic energy. An image formed on the viewing assembly 20 has been retained for at least ten seconds without serious degradation of image quality. Controlled erasure of this visible image can be accomplished either by slightly heating or slightly cooling the thermochromic coating, although cooling is preferred to place the thermochromic coating in condition to receive a new image. Air cooling of the liquid crystal layer has been employed for satisfactory image erasure.

Another embodiment of the invention is shown in FIG. 3. This embodiment includes an image converting apparatus shown generally at 40 and including a casing 41 shown in section, the casing having a first opening 42 and a second opening 43 formed therein. A viewing assembly 44 is received in the first opening 42 and a transparent window 45 made of glass or another suitable material is received in the opening 43. The casing 41, viewing assembly 44, and window 45 define an enclosed volume 50 which may be evacuated or filled with an inert atmosphere for a purpose described below.

The viewing assembly 44 includes an absorptive layer 46 similar to the absorptive layer 22 and a thermochromic coating 47 similar to the thermochromic coating 24 of the embodiment shown in FIGS 1 and 2. The thermochromic coating 47 may be disposed directly on the absorptive layer 46 or an intervening support member (not shown) corresponding to the diaphragm 12 may be provided. As will be seen, however, the absorptive layer 46 is not subjected to the hydrostatic loading applied to the viewing assembly 20 of the previous embodiment. Heat may be supplied as desired to establish a thermal bias on the thermochromic layer 47.

The plan view outline of the viewing assembly 44 and the window 45 may be circular or of any other suitable configuration. Since the illumination reflected or refracted from the thermochromic coating 47 may be viewed at an offset position with respect to the window 45 by an observer 49, as depicted in FIG. 3, it is desirable to have the overall size of the window 45 somewhat greater than the corresponding dimensions of the viewing assembly 44. If a thermochromic coating 47 is chosen which is adversely affected by exposure to air, the volume 50 may be evacuated and retained as a partial vacuum or refilled with a suitable gas which does not adversely affect the thermochromic coating.

An example of the operation and utility of the FIG. 3 embodiment is now given. A section view of a typical honeycomb panel 54 is shown with a void or unbonded region occurring at 55 between the cover sheet 56 and the core 57. The image converting apparatus 40 is positioned on the cover sheet 56 so that the absorptive layer 46 directly contacts the cover sheet. An acoustic transducer 58 is disposed in contact with the opposite cover sheet 59 of the honeycomb panel to direct acoustic energy through the honeycomb panel toward the image converting apparatus 40. It may be necessary to coat the interfaces between the cover sheet 56 and the absorptive layer 46 and also between the cover sheet 59 and the acoustic transducer 58 with a suitable substance, such as water, to enhance the transmission of the acoustic energy.

When power is applied from a suitable source to the acoustic transducer 58, acoustic energy from the transducer is transmitted from the cover sheet 59 into the core 57 and from there into the cover sheet 56; this transmitted acoustic energy is coupled into the absorptive layer 46 whereat the acoustic energy is converted into thermal energy which affects the color of the thermochromic coating 47. However, the presence of an unwanted bonding void 55, or a foreign substance such as water in one of the cells of the honeycomb core 57, diminishes or otherwise modulates the intensity of the acoustic energy which is normally transmitted through nondefective regions of the honeycomb panel 54. This change in transmitted acoustic energy shows up in the image converting apparatus 40 as a variation in the color of the thermochromic coating 47 seen by an observer 49. The observer thus knows that the honeycomb panel has a defect which can be marked on the particular panel region over which the image converting apparatus 40 is positioned. Of course, it will be understood that the embodiment shown in FIG. 3 is not limited to use as a honeycomb tester and can be used wherever acoustic energy can be applied to or is present in an object being tested.

The underwater imaging capability apparent from FIG. 1 suggests the application of the present invention to underwater acoustic detection systems, such as sonar, and other oceanographic applications. For example, the viewing assembly 20 could be encased in a thermally isolated temperature controlled enclosure and supplied with received acoustic energy by appropriate apparatus such as acoustic wave guides or by an acoustic-electronic repeater. Viewing of the visual images could be obtained either directly or with a conventional close-circuit television link for viewing at remote locations.

We claim:
1. Apparatus for converting acoustic energy into a visible presentation, comprising:
casing means having a first opening and second opening;
an acoustic energy absorptive member received in said first opening to have a first side exposed externally of said casing means and a second side facing within said casing means,
said acoustic energy absorptive member being made of a material which converts acoustic energy impinging thereon into thermal energy;
an uninterrupted thermochromic coating disposed in heat transfer relationship with the second side of said absorptive member; and
a transparent window disposed in said second opening to admit illumination from outside said casing for illuminating said thermochromic coating and also to expose said thermochromic coating to view from outside said casing means, so that the thermal energy imparted to said absorptive member by conversion of acoustic energy impinging thereon is represented by a visible condition of said thermochromic coating viewable through said window.

2. Apparatus as in claim 1, wherein the first side of said acoustic energy absorptive member protrudes from said first opening so that said absorptive member can be positioned in acoustic energy transfer engagement with a workpiece while maintaining said casing means out of engagement with such workpiece.

3. Apparatus as in claim 1, wherein:
said casing means is dimensioned so that said thermochromic coating and said window are spaced apart one from the other to define an enclosed volume within said casing means.

4. Apparatus for converting acoustic energy into a visible presentation, comprising:
an acoustic energy absorptive member comprising a thin sheet of a material which converts acoustic energy impinging thereon into thermal energy, said absorptive member having a first side onto which acoustic energy may be impinged and a second side;
a thermally conductive support layer having a first side which is substantially coextensive with said absorptive member and which is disposed in heat transfer and load-supporting contact with the second side of said absorptive member so that said support layer acquires at least a substantial part of the thermal energy imparted to said absorptive member and supports the ambient pressure load applied to said absorptive layer, and having a second side coextensive with said first side; and
a thermochromic coating uninterruptedly disposed over substantially all of the second side of said support layer to be responsive to the thermal energy acquired from said absorptive member by said support means, so that the thermal energy imparted to said absorptive member by conversion of acoustic energy impinging thereon is represented by a visible condition of said thermochromic coating.

5. Apparatus as in claim 4, wherein said thermochromic coating comprises a liquid crystal thermochromic substance.

6. Apparatus as in claim 4, wherein:
said support means comprises a diaphragm one side of which is in heat transfer contact with said absorptive member; and
said thermochromic coating is disposed on the other side of said diaphragm.

7. Apparatus as in claim 6, wherein said absorptive member comprises a layer of viscoelastic acoustic energy absorptive material contacting said one side of said diaphragm; and said thermochromic coating comprises a liquid crystal thermochromic coating.

8. Apparatus as in claim 6, further comprising;

a tank for receiving a quantity of a medium which is a relatively efficient transmitter of acoustic energy, said tank having an opening in a wall thereof;

said opening being occupied by the combination of said absorptive member, said diaphragm, and said thermochromic coating disposed so that the first side of said absorptive layer faces into said tank, said diaphragm is retainedly engaged with said tank wall, and said thermochromic coating faces out of said tank; and a source of acoustic energy disposed in said tank to impart to an energy-transmitting medium therein acoustic energy directed to impinge on said absorptive member and on an object which may be interposed in said tank between said acoustic energy source and said absorptive member.